United States Patent [19]
Chao

[11] Patent Number: 4,884,960
[45] Date of Patent: Dec. 5, 1989

[54] DIE FOR EXTRUDING AND WASH COATING

[75] Inventor: Tai-Hsiang Chao, Mt. Prospect, Ill.

[73] Assignee: Allied-Signal Inc., Morris Township, N.J.

[21] Appl. No.: 190,867

[22] Filed: May 6, 1988

[51] Int. Cl.$^4$ .................... B29C 47/02; B29C 47/30
[52] U.S. Cl. ..................... 425/97; 118/306; 118/313; 118/317; 264/129; 264/177.12; 425/90; 425/96; 425/464
[58] Field of Search .............. 425/97, 100, 104, 90, 425/91, 92, 95, 96, 103, 464, 461; 118/306, 313, 314, 315, 317; 264/129, 177.12, 177.11

[56] References Cited

U.S. PATENT DOCUMENTS

| | | | |
|---|---|---|---|
| 1,601,536 | 9/1926 | Laskey | 425/464 |
| 3,034,729 | 5/1962 | Gray et al. | 118/306 |
| 3,265,778 | 8/1966 | Griffith | 425/97 |
| 3,579,732 | 5/1971 | Heinzelman | 118/317 |
| 3,643,727 | 2/1972 | Longoni et al. | 164/76 |
| 3,790,654 | 2/1974 | Bagley | 264/177 |
| 3,824,196 | 7/1974 | Benbow et al. | 252/455 R |
| 3,905,743 | 9/1975 | Bagley | 425/464 |
| 4,196,099 | 4/1980 | Hunter et al. | 252/437 |
| 4,200,552 | 4/1980 | Noguchi et al. | 252/466 PT |
| 4,233,932 | 11/1980 | Blakeslee | 118/306 |
| 4,247,422 | 1/1981 | Davies | 252/465 |
| 4,271,103 | 6/1981 | McAlister | 264/1 |
| 4,335,023 | 6/1982 | Dettling et al. | 252/466 PT |
| 4,370,944 | 2/1983 | Nagata et al. | 118/302 |
| 4,722,819 | 2/1988 | Lundsager | 264/177.11 |
| 4,747,986 | 5/1988 | Chao | 264/177.11 |

FOREIGN PATENT DOCUMENTS 2493219 5/1982 France.

OTHER PUBLICATIONS

U.S.S.N. 946,234 (Patent has not yet issued).

Primary Examiner—Jay H. Woo
Assistant Examiner—K. P. Nguyen
Attorney, Agent, or Firm—John G. Tolomei; Harold N. Wells; Roger H. Criss

[57] ABSTRACT

A honeycombed structure is extruded and wash coat applied to the interior channels of the structure before the honeycomb structure is separated from the die in which it is formed. This method produces the honeycombed structure using a die that includes a die body having an inlet and an outlet side, a plurality of parallel pins defined by the body that correspond to the shape of the channels in the honeycombed structure, and a discharge zone that communicates directly with the outlet side of the die and is defined by the open area between the pins. The extrudable material enters the discharge zone from a series of feed passages defined by the pins and a plurality of webs that interconnect the pins. Each pin has an interior duct with an opening at the end of each pin. A series of internal passages in the die body receive fluid from one or more ports on the periphery of the die and distribute the fluid to the ducts. Spraying the wash coat from the ends of the pins eliminates the need for a separate wash coat step after the honeycombed structure has been formed. In addition, wash coat is continually applied to the interior walls of the channel by the duct as the channel passes the end of the pin so that the entire length of the channel is covered with wash coat. This invention can be used in a wide variety of die configurations, but is especially suited for a die having segmented slots for feed passages and square channel forming pins defined in part by the segmented slots.

10 Claims, 2 Drawing Sheets

DIE FOR EXTRUDING AND WASH COATING

BACKGROUND OF THE INVENTION

1. Field of the Invention

This invention relates generally to honeycombed structures formed of ceramic materials. More specifically, this invention relates to the forming of ceramic materials into thin wall honeycombed structures by extrusion and the coating of the channels in the structure with a fluid.

2. Description of the Prior Art

The term honeycombed structures is used generally to describe a thin-walled body having a series of regularly or irregularly shaped parallel channels that extend continuously over the length of the body and are separated by wall elements that give the body its structure. The cross-section of each channel may vary from channel to channel but usually will have a regular geometric shape. These honeycombed structures find use in regenerators, heat exchange equipment, filters, and as catalyst carriers. The use of such carriers is also well known in the treatment of automotive exhaust gases where the carriers are typically treated with a wash coat of catalytic material.

Ceramic honeycombs have been formed by extrusion methods with fairly good success. The extrusion method uses a hydraulic ram to push the extrudable material into a series of feed passages which communicate with a discharge area. The discharge area has a series of projections that displace the extrudable material from the sections that will eventually correspond to the channels and define a series of gaps which shape the extrudable material into the walls of the honeycombed structure. It has become common practice to extrude honeycombs having channel densities of from 80 to 450 channels per square inch upon extrusion, and 100 to 600 channels per square inch after shrinkage of the extrudable material during curing. Typically, the wall thicknesses between the channels of the honeycombed structure will vary between 0.002 and 0.050 inches.

When the honeycombed structures are used as catalyst carriers, a portion of the catalytic material is usually coated onto the sidewalls of the channels. A fluid containing the desired catalytic material contacts the channel walls to deposit the material on the surface of the channel. In the case of automotive exhaust gas purification, the fluid is usually a liquid referred to as a wash coat that contains an alumina component and one or more additional metal oxide components as promoters. Generally preferred metal oxide components present in the wash coat are ceria, titania, zirconia, lanthanum oxide, copper oxide, and nickel oxide. Prior art methods apply the wash coat to formed honeycombed structures by spraying the wash coat into the channels under pressure or immersing the honeycomb into a wash coat bath. Regardless of the method employed, wash coating of the monolith requires at least one extra procedure in the manufacture of most catalytically active honeycombed structures.

In addition to requiring an extra step, it is often difficult to apply the wash coat in a manner that will uniformly cover the channel walls. Either the wash coat material does not completely coat the channel walls, or excessively thick deposits of wash coat materials may be found in corners of the polygonally shaped channels. Incomplete wash coat coverage fails to make complete utilization of the honeycombed structure surface while excessive deposits waste valuable catalytic materials and reduce the overall surface area of the channels. These problems stem, at least in part, from the high aspect ratio of the fine channels and the resulting difficulty in getting wash coat down the entire channel length.

DISCLOSURE STATEMENT

U.S. Pat. No. 4,247,422, issued to Davies and U.S. Pat. No. 4,200,552, issued to Noguchi et al. are generally directed to purifying automotive gases and describe the coating of honeycombed structures by the immersion or dipping of the structure in a bath of wash coat.

U.S. Pat. No. 4,335,023, issued to Dettling et al. teaches a method of forming honeycombed structures having polygonally shaped channels with rounded corners to prevent excess wash coat materials from accumulating in corners.

U.S. Pat. No. 4,196,099 mentions spraying a wash coat onto a metal substrate used in an automotive catalytic converter.

U.S. Pat. Nos. 3,905,743 and 3,790,654, issued to Bagley, described a method for forming a thin-walled honeycomb extrusion that uses a die having feed passages and intersecting feed slots. Bagley claims and primarily teaches aligning the feed passages to communicate directly with the interconnections or intersections between a series of orthogonal slots.

U.S. Pat. No. 3,824,196, issued to Benbow et al., describes a method of making a thin-walled honeycombed structure by passing a plastic material through a die having a series of feed passages that again intersect and communicate directly with intersecting points in a series of orthogonal slots that define the shape of the extrusion. Benbow also teaches that the feed passages should have a greater cross-sectional area than the transverse cross-sectional area of the discharge slots in order to provide sufficient material for filing the discharge slots.

U.S. Pat. No. 4,747,986 and describes an extrusion die for extruding honeycombed structures having a solid body and a plurality of parallel pins that are defined by the body and correspond to the shape of the channels in the honeycomb. A discharge zone defined by the open space between the pins corresponds to the cross-sectional shape of the honeycomb. A plurality of feed passages communicate directly with the discharge area through the regions of reduced transverse width.

SUMMARY OF THE INVENTION

It is a broad object of this invention to simplify the manufacture of wash coated honeycombed structures.

A further object of this invention is to obtain more uniform wash coating of honeycombed structures.

A yet further object of this invention is to reduce the necessary procedures for forming and wash coating a honeycombed structure while simultaneously obtaining more uniform wash coat coverage of a honeycombed structure.

These and other objects are achieved by applying a fluid to the internal channel walls of a honeycombed structure as it is extruded. Accordingly, this invention is the application of wash coat to one section of channel walls in a honeycomb structure while a connected section of those walls are still in a die that forms the structure.

Thus, in one aspect, this invention is a method of forming honeycombed structures wherein a fluid is applied to the internal channel walls of the honeycomb before the honeycombed structure is separated from a die for forming the structure. In another aspect this invention is a die for forming honeycombed structures that has a series of channel of forming pins and an arrangement of internal ducts and passages for spraying fluid from the ends of the pins and into contact with the sidewalls of the structure channels.

Accordingly in one embodiment, this invention is an extrusion die for producing multi-channel structures from an extrudable material and contacting the interior of each channel with a fluid. The die includes a die body having an inlet and an outlet side and an arrangement of parallel pins that correspond to the shape of the channels in the structure. A discharge zone, at the outlet side of the die, is defined by the open area between the pins and has the shape of the honeycombed structure. Extrudable material enters the discharge zone from a series of feed passages that are defined by the pins and a series of webs that interconnect the pins. On the side opposite the discharge zone, the feed passages communicate directly with the inlet side of the die. Each pin has an interior duct that opens at the end of the pin in the outlet side of the die. Means are provided for distributing fluid to the blind end of the duct which is located inside the pin.

In another embodiment, this invention is a method of forming multi-channel honeycombed structures and coating the inside of the channels with a fluid. In the method, extrudable material is pressed through a series of feed passages that feed the extrudable material into a discharge zone. An arrangement of parallel pins in the discharge zone define the shape of the channel in the honeycombed structure while the spaces between the pins define the shape of the honeycombed structure. The discharge zone impedes the travel of the extrudable material through the pins so that the material fills the entire discharge zone. As the honeycombed structure moves out of contact with the ends of the pins, a coating fluid, distributed to the ends of the pins, is sprayed onto the interior walls of the channel before the honeycombed structure is separated from the discharge zone.

Other aspects, embodiments, and details of this invention will become apparent from the following detailed description.

DETAILED DESCRIPTION OF THE INVENTION

Figure 1:
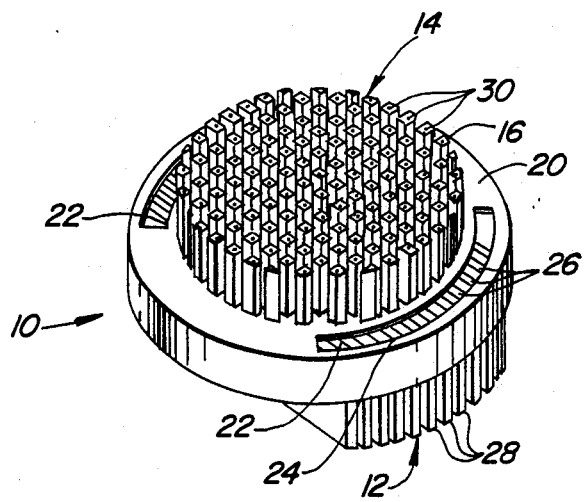
FIG. 1 is an isometric view looking downward onto the outlet side of an extrusion die.

Referring then to FIG. 1, this view depicts an extrusion die body 10. FIG. 1 shows the die upside down from its usual position when it is in use. The die has an inlet surface 12, which is usually the top of the die and an outlet surface 14 from which a honeycomb structure is usually downwardly discharged. A grid work of 16 pin performing channels, that define the channel shape in a honeycomb structure, extend from a support ring 18 having a contact face 20. Fluid is delivered to the die across contact face 20 through a wash coat port 22. Port 22 is defined by a groove 24 that extends into support ring 18 over an extended circumferential width to provide a distribution chamber that communicates with a series of outer passages 26. Outer passages 26 communicate with conduits 28 that extend across inlet surface 12 and distribute fluid, in a manner hereinafter described, through a series of ducts 30 that extend down the interior of pin 16.

Figure 2:
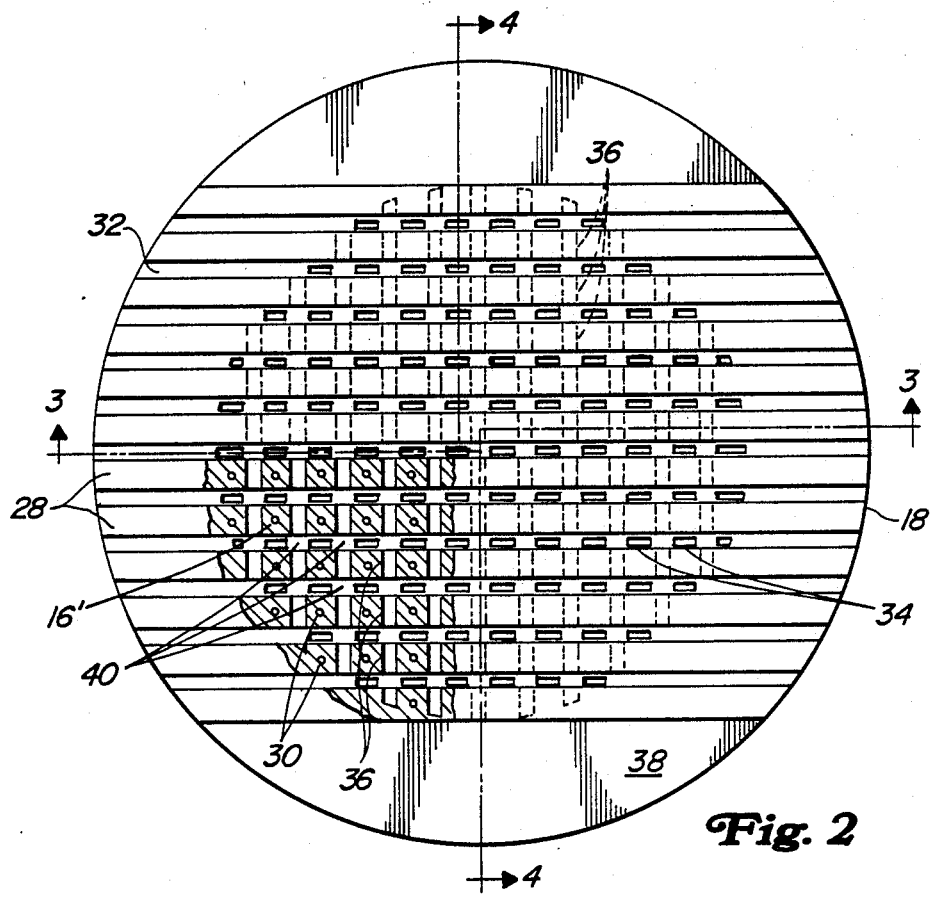
FIG. 2 is a plan view looking at the inlet side of the extrusion die of FIG. 1.

The arrangement of conduits 28 is more clearly shown in FIG. 2. Conduits 28 extend across the top of die 10, over opposite sides of support ring 18, and have a rectangular cross-section. A space 32 between each of the conduits 28 allows extrudable material to flow past the top of the conduits and into a series of feed passages arranged in the form of a first series of segmented slots 34 that extend in a direction parallel to the conduits and a second set of segmented slots 36 orthogonal to the first set of slots. Conduits 28 are positioned directly above slots 36 by connection to a portion of pins 16 that extend above a top face 38 of supporting ring 18. Thus, inlet conduits 28 are located above face 38. In a lower left-hand quadrant of FIG. 2, a portion of conduits 28 have been removed to show slots 34 and 36 along with a sectioned portion of the pins denoted 16'. The channel forming pins are connected above their corners by a series of webs 40. Ducts 30 shown at the interior of each pin are in communication with a conduit passageway in the conduits 28.

Figure 3:
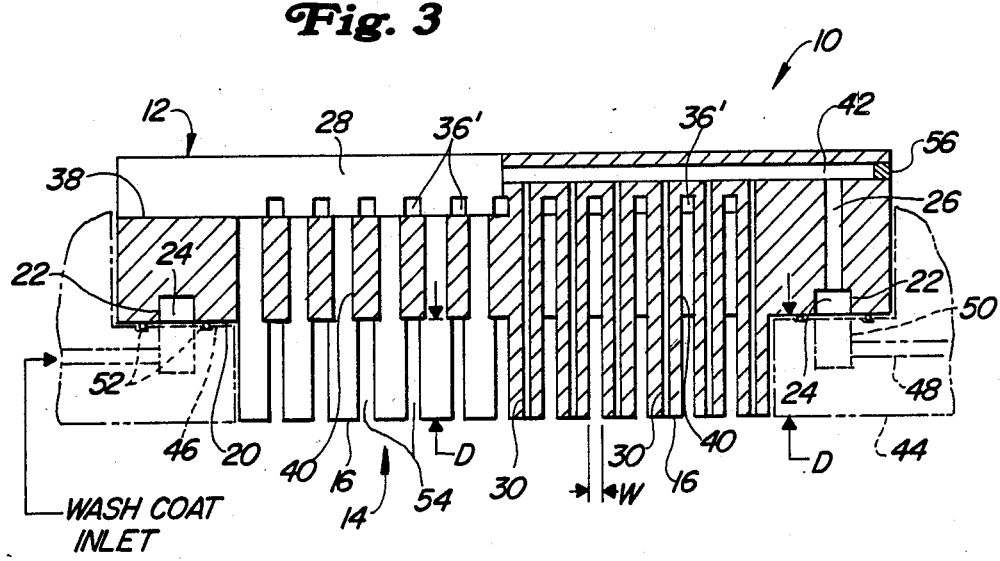
FIG. 3 is an offset section of the die of FIG. 1 taken along lines 3—3 of FIG. 2.

FIG. 3 indicates the conduit passageway by number 42. Looking at the right-hand portion of the section of FIG. 3, passageway 42 receives fluid from an outer passage 26. Die 10 is shown positioned in the jaws 44 of a hydraulic press used to push the extrudable mixture through the die. Contact face 20 rests against a seating face 46 of jaws 44. An internal passageway in the jaws 44 communicates fluid to seating face 46 via an outlet port 50 located on seating surface 46. Port 50 registers with wash coat port 22 to communicate wash coat, via groove 24 to outer passages 26. In order to increase fluid flow to ducts 30, similar ports and passageways are provided on both sides of the die to communicate both ends of conduit passageways 42 with the source of fluid delivered to the die. Die 10 is normally clamped into position in jaws 44 in a way that produces a high sealing force between contact surface 20 and seating face 46. A pair of O-rings 52 occupy recesses in seating face 46 and border both sides of ports 22 and 50 to insure sealed communication between these ports. Ducts 30 intersect conduit passageways 42 to establish fluid communication therewith. The very fine diameter of ducts 30 will cause fluid leaving the ends of pins 16 through the narrow opening of the duct when delivered with sufficient pressure, to be sprayed outward against the walls of the channel.

FIG. 3 also clarifies the manner in which extrudable material passes through the die. Extrudable material passes from inlet surface 12 between conduits 28 to top face 38. The area above segmented slots 34 is completely open to directly receive extrudable material. The conduits 28 are positioned directly above the remainder of the feed passages that comprise segmented slots 36. A portion of the conduit 28 is cut away directly above the slots 36 to provide an upper slot portion 36' that communicates extrudable material from the sides of conduits 28 into the remainder of slots 36. Without extended slot portion 36, the webs 40 that connect channel pins 16 would prevent lateral movement of extrudable material into slots 36. As the extrudable material passes from the slots 34 and 36, it enters a series of spaces 54 in the lower portion of the die that define a discharge zone in communication with outlet surface 14.

Figure 4:
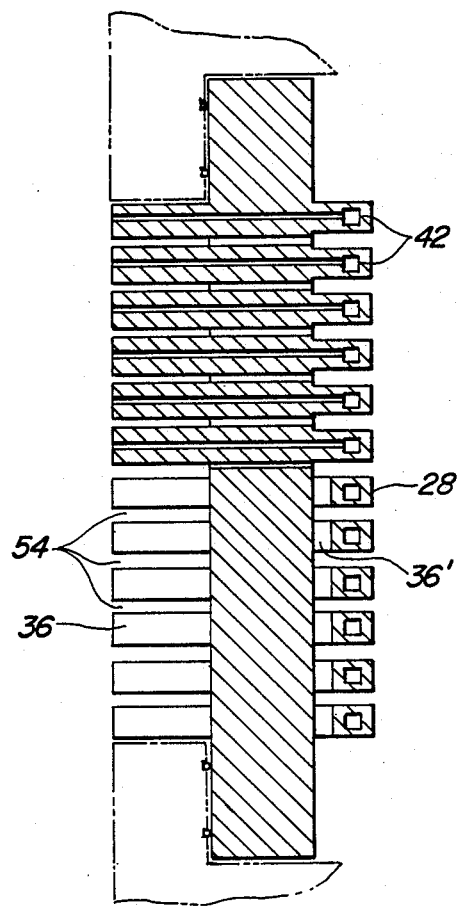
FIG. 4 is an offset section of the die of FIG. 1 taken along lines 4—4 of FIG. 2.

The communication of extrudable material to opposite sides of slot 36' can be more fully seen from FIG. 4 that shows a section transverse to the conduits. The section also shows the cross-sectional area of conduit passageways 42. Depending on the size of the die, a vertical height of conduits 28 may be increased as necessary to provide additional height in conduit passageways 42 for increasing the available flow area.

The square pins, discharge zone, and slots forming feed passages is a preferred arrangement for extruding the honeycombed structure. The web sections 40 are slightly larger than the segmented slots to provide the necessary overlap to secure pin 16 to the web sections. The web and pin overlap usually extends for 5-20% of the maximum length of the slots. Reducing the slot length at the ends of the slots concentrates extrudable material at the region of smallest hydraulic diameter through the feed passageways. The segmented portions of slots 36 and 34 and webs 40 extend down to the level of contact face 20. Below the bottom of the web sections, the segmented slots coincide with the non-intersecting portion of spaces 54. The cross-section of intersecting spaces 54, taken across a plane transverse to the principal axis of pins 16, forms what has been previously referred to as the discharge area. In the case of an orthogonal grid work, as defined by square pins, the flow of feed is proportional to the effective width of spaces 54. The effective width varies relative to the non-intersecting portion of the slots where it can be represented as "W" and the slots intersections, where for 90° intersection, the effective width equals "W" over the co-sign of 45°. Accordingly, the non-intersecting portions of spaces 54 present regions of reduced width between the pins which increase the flow resistance in these regions. Thus, the intersecting portions of spaces 54 have a lower resistance to flow than the non-intersecting portions of spaces 54 due to the greater effective width of this area. In this regard, segmented slots 34 and 36, or more generally the feed passages, will usually have from 1.2 to 4 times the flow resistance of spaces 54. As the extrudable material flows down slots 34 and enters intersecting spaces 54, these spaces extend along the lower portion of pins 16 for a depth D, see FIG. 3, which is sufficient to allow the extrudable material to flow laterally and completely fill the intersecting portions of the spaces which do not directly communicate with the segmented slots. Although the required depth D will vary with the viscosity of the extrudable material—due to the arrangement of this invention which introduces the feed material into the non-intersecting portions of the slot—depth D may be reduced since lateral flow is encouraged by the higher flow impedance associated with the non-intersecting portions of spaces 54. After the feed material has assumed the form of the honeycombed structure, as defined by spaces 54, it is discharged from the die through outlets surface 14.

The ends of ducts 30 apply wash coat to the interior walls of the honeycombed structure as it is pushed past pins 16. Thus, wash coat can be applied to one portion of the channel while an immediately adjacent portion is still in contact with the extrusion die, i.e., the wash coat can be applied to a channel while the entire channel has not yet been separated from the die. Applying the wash coat to the interior of the channel as it is pushed past the end of the pin assures that all of the channel will be contacted with wash coat. By controlling the flow rate of fluid into the ducts and the discharge pressure at the end of each duct, a desired amount of fluid can be applied to the interior walls of the channels. A duct size of approximately 0.020 inches in combination with the discharge pressure of about 5-10 psi is believed to provide a spray effect at the end of discharge pin 16 for obtaining a uniform dispersion of fluid that will cover the entire transverse cross-section of the channel walls.

Although the Figures show segmented and intersecting slots arranged to provide square channel pins, this invention may be applied any type of extrusion forming die provided the arrangement can accommodate some form of internal passageways to communicate fluid to the die body and internal ducts having openings at the end of the members forming the channels of the honeycombed structure. Flat sided geometric patterns are particularly preferred since the slot intersections are definitely defined and can be occupied in the inlet portion of the die by web sections.

The die is preferably made from a solid block of material. The segmented slots, conduits, and other die features may be formed by removing the base material of the die from the solid blocks through appropriate machining techniques. It has been found that in order to make very fine honeycombs having 200 channels per inch or more, the necessary tolerance and uniformity can be easily achieved by electric discharge machining. It is also contemplated that laser cutting techniques can be advantageously employed to machine the die. These same techniques can also be used to form the internal passageways and ducts in the pins for distributing fluid. In the preferred form of this invention, the conduit passageway is formed by using an appropriate technique to machine transversely across the entire width of the die body to form passageway 42 shown in FIG. 3. Once formed, the extreme ends of conduit passageways 42 are plugged with an appropriate filler material 56 such as silver solder or a weld metal which is compatible with the base material of the die. Outer passageways 26 are then cut in from the contact face of the die until they intersect the outer end of conduit passageways 42. The ducts 30 can then be formed by machining, from the discharge end of the pins, along the axis of the pin until the duct intersects conduit passageways 42. The actual diameter of the ducts will be determined by the pin size, the available machining technique, the viscosity of the fluid to be discharged therethrough, the desired discharge pressure and flow rate at the end of the duct.

A variety of materials can be used for forming the die. The only requirements are that the material can be formed or machined into the shape of the desired die and will have sufficient strength to withstand the pressure exerted on the die during the extrusion process. A preferred material for the die is cold-rolled steel. An advantage of employing burning methods, such as electric discharge machining or laser cutting techniques, to machine the die from cold-rolled steel, is that the die stock may be hardened prior to the machining process.

ILLUSTRATIVE EMBODIMENT

In order to obtain honeycombed structures by the method of this invention using a die, an extrusion die is prepared. The die has an overall diameter of approximately 1⅜ inches and an overall thickness of a ¾ inches. The discharge portion of the die was machined to approximately 1-3/16 inch diameter to provide approximately a 3/16 inch contact face width around the channel forming pins. Electric discharge machining is employed to form 1/16 inch by 1/40 inch segmented slots and square pins approximately 0.075 inches in diameter. This pattern yields a channel density of approximately 100 openings per square inch. The thickness of the die is divided about evenly into intersecting slots, segmented slots, the projection of conduits above the top face of the die. In this arrangement, the segmented slots have about four times the resistance to flow for the hereinafter described feed mixtures as that of the intersecting slots. Vertical outer passages are machined in the die for communicating fluid from the jaws of a press holding the die to conduit passageways that traverse the interior of the conduits. The conduit passageways extend across the inlet surface of the die. Each conduit passageway communicates with a row of ducts having an 0.020 inch diameter. Each duct passes through the interior of the pins which are in contact with a conduit.

An extrudable material comprising 43 parts of kaolin clay, 39 parts of talc powder, 18 parts of alumina, 31 parts of water, and 4 parts of methocel as an extrusion and are mixed by a paddle mixer to provide an extrudable mixture. This mixture is introduced into the cylinder of an extrusion apparatus that contains the previously described die. A hydraulic piston produces a pressure of about 2000 psi on the extrudable mixture which forces the mixture through the die at a rate of approximately 30 inches per minute. The overall honeycombed structure will have approximately 100 openings per square inch. A wash coat material consisting of 6.7 wt. % ceria and 20 wt. % alumina is pumped to a port in the jaws of the die at a pressure of 40 psig. The wash coat enters the die through a port located on the contact surface of the die which is opposite a port in the jaw. The Internal passageways in the die distribute the wash coat to the ducts. Wash coat is sprayed from the end of the pins through the ducts into contact with the interior walls of the honeycombed structure. An extrusion recovered from the bottom of the apparatus will have well formed walls between the channel openings having a thickness of about 0.025 inches and will have the interiors of the channel walls completely covered with the wash coat material. The ceramic honeycombed structure was then dried and fired to approximately 1300° C. which reduced the thickness of the channel walls to approximately 0.020 inches, increased the number of channels to approximately 160 openings per square inch, and dried the wash coat leaving a catalytic deposit on the walls having a thickness of approximately 50 microns.

Although this invention has been described primarily in the context of a single preferred embodiment, this is not intended to limit the invention to the specific details or method associated therewith.

What is claimed is:

1. An extrusion die for producing multichanneled honey-combed structures from an extrudable material and contacting the interior of the formed channels with a wash coat, said die comprising:
   (a) a die body having a plurality of elongated and mutually parallel pins arranged in a series of rows;
   (b) at least two sets of uniformly spaced slots defined by first ends of said pins, said sets of slots being oriented into an intersecting arrangement;
   (c) a plurality of web sections interconnecting second ends of said pins;
   (d) a plurality of feed passages defined by the second ends of said pins and said web sections, said passages communicating directly with said slots, at least a portion of said passages extending upstream of said web sections;
   (e) an axial duct through the interior of each pin having an opening at said first end of each pin;
   (f) a plurality of conduits located upstream, with respect to the flow of extrudable material, of said web sections, each of said conduits connecting the second ends of all of said pins in one of said rows, said conduit having a passageway in communication with the duct of each pin in said row; and
   (g) means for distributing wash coat to each of said passageways.

2. The die of claim 1 wherein an elongated wash coat port extends about a peripheral portion of said die and at least one end of each of said passageways are in direct communication with said port to provide said means for distributing wash coat.

3. The die of claim 1 wherein said passageways are substantially straight and extend in a direction transverse to the axis of said pins.

4. The die of claim 3 wherein at least one end of said conduits extend to a side of said body.

5. The die body of claim 4 wherein said die has a support face adapted for sealing contact, the end of each conduits at said side of said die body are sealed with a plug, and a wash coat port, having an extended length about a peripheral portion of said die body, communicates said support face with said passageways to provide at least a portion of said means distributing wash coat.

6. An extrusion die for producing multi-channeled structures from an extrudable material and contacting the interior wall of said structure with a fluid, said die comprising:
   (a) a die body having an inlet side and an outlet side;
   (b) a plurality of parallel pins defined by said body and corresponding to the shape of the channels in said structure;
   (c) a discharge zone communicating directly with said outlet side, defined by the open area between said pins and having the shape of said structure;
   (d) a plurality of feed passages defined by said pins and a series of webs interconnecting said pins, said feed passages communicating with said inlet side and communicating directly with said discharge zone;
   (e) a support ring bordering said pins in a fixed relationship therewith having a principal plane transverse to the elongated axis of said pins and a support surface parallel to said principal plane;
   (f) an axial duct through the interior of each pin having an outlet opening at the end of each pin;
   (g) a plurality of conduits, each of said conduits connecting the second ends of all of the pins in one of said rows, and each of said conduits having and at least one end in contact with said ring and an internal passageway in communication with the duct of each pin in said row;

(h) a distribution chamber in said ring communicating all of said passageways on the same side of said die with said support surface; and (i) a wash coat part communicating said support surface with said distribution chamber.

7. The die of claim 6 wherein said conduits are located above an inlet surface, said inlet surface is defined by said webs and an inlet face of said ring, and said inlet face is on the side of the ring opposite said support face.

8. The die of claim 7 wherein a distribution chamber is located on each side of said die.

9. The die of claim 8 wherein said pins extend above said inlet face and at least a portion of said feed passages extend above said inlet face.

10. The die of claim 9 wherein said internal passageways are cut through the entire length of said dies and a plurality of plugs block the ends of each passage.

* * * * *